United States Patent [19]
Chiorino

[11] Patent Number: 6,129,345
[45] Date of Patent: Oct. 10, 2000

[54] CLAMP DEVICE FOR USE IN WELDING SHEET METAL ELEMENTS

[75] Inventor: Luigi Chiorino, Turin, Italy

[73] Assignee: Comau S.p.A., Turin, Italy

[21] Appl. No.: 09/145,346

[22] Filed: Sep. 1, 1998

[30] Foreign Application Priority Data

Oct. 14, 1997 [IT] Italy .................................. TO97A0906

[51] Int. Cl.[7] ........................................................ B25B 1/04
[52] U.S. Cl. ............................................. 269/32; 269/239
[58] Field of Search .................................... 269/244, 246, 269/96, 32, 239, 55, 71, 900

[56] References Cited

U.S. PATENT DOCUMENTS

| | | | |
|---|---|---|---|
| 4,669,227 | 6/1987 | Treppner | 269/900 |
| 4,687,190 | 8/1987 | Yang | 269/246 |

*Primary Examiner*—Robert C. Watson
*Attorney, Agent, or Firm*—Sughrue, Mion, Zinn, Macpeak & Seas, PLLC

[57] ABSTRACT

A device for locating and locking components of sheet metal which are to be subjected to a welding operation comprises a fixed supporting element and a movable clamp element which can be closed over the supporting element. The movable clamp element is carried by a body which is supported by a fixed supporting structure through said fixed supporting element, to which said body is directly connected.

4 Claims, 3 Drawing Sheets

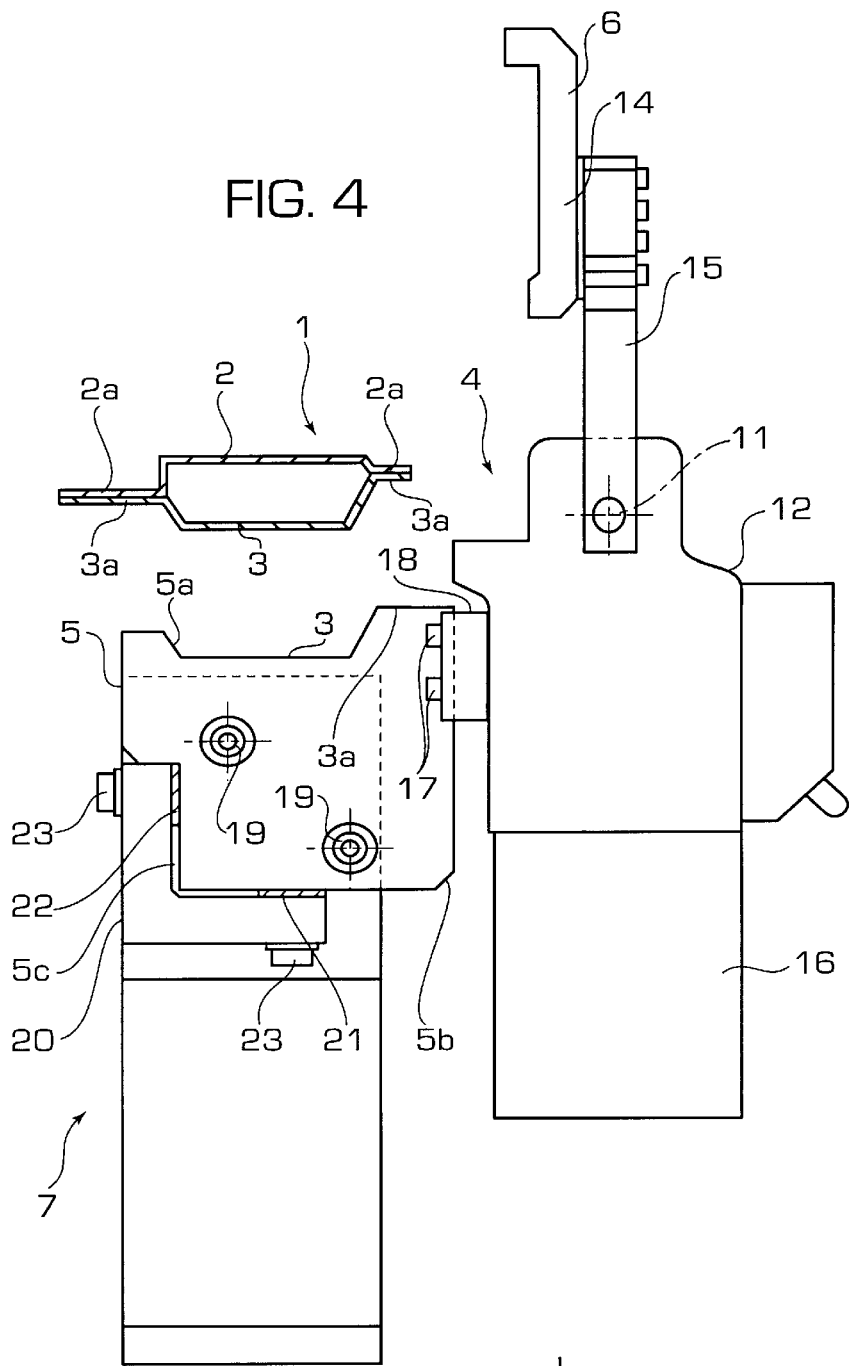
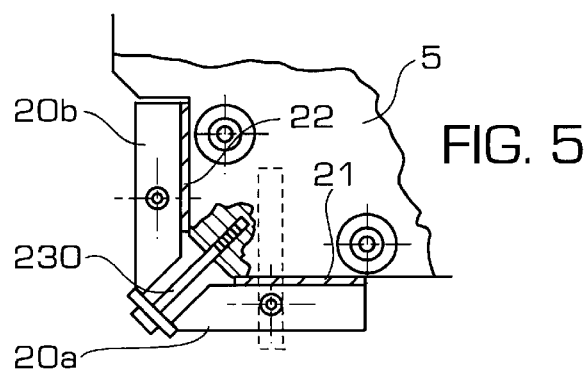

as to obtain
CLAMP DEVICE FOR USE IN WELDING SHEET METAL ELEMENTS

BACKGROUND OF THE INVENTION

The present invention relates to devices for locating and locking in position components of pressed sheet metal which are to be subjected to a welding operation. In particular, the invention relates to clamp devices of the type comprising:

- a first element for supporting the sheet metal elements, which is rigidly connected to a fixed support structure, and
- a second element for clamping the sheet metal elements to be welded, which is supported by a body carried by said fixed supporting structure so as to be displaceable between an inoperative position, spaced from the first supporting element, and an operative position, in which it is adjacent to the first supporting element and cooperates therewith for clamping the components of sheet metal to be welded.

The clamp devices of the above indicated type have been known and used for a long time, for instance in assembling operations by means of welding of units constituted by elements of pressed sheet metal, such as motor-vehicle bodies or subassemblies thereof.

For a prompt reference, FIG. 1 shows one embodiment of a clamp device according to the prior art. Typically, with reference to this drawing, a structure 1 of pressed sheet metal is constituted by two sheet metal elements 2, 3 which must be welded by means of electric spot welding at two juxtaposed flanges 2a, 3a thereof. Elements 2, 3 are clamped in the proper welding position by means of a clamp device 4 comprising a fixed supporting element 5 and a movable clamp element 6 adapted to be closed over supporting element 5 to clamp the two juxtaposed flanges 2a, 3a in the proper welding position, so that these flanges can then be welded to each other by applying electric welding spots at areas not covered by the two elements 5, 6 of the clamp device 4. The fixed supporting element 5 is connected by screws to a fixed supporting structure 7 by means of an angled member 8. Registering plates 9, 10 are interposed between the angled member 8 and the fixed structure 7 and the supporting element 5, respectively. The movable clamp element 6 is pivotally supported around an axis 11 by a supporting body 12 which on its turn is secured by screws to the structure 7 with the interposition of a registering plate 13. A registering plate 14 is also interposed between the movable clamp element 6 and a lever 15 which is directly pivotally mounted around axis 11 on the body 12 and whose rotation is driven by a fluid cylinder 16 which is also carried by body 12. In the known device, the use of registering plates 9, 10, 13, 14 is due to the need of assuring that elements 5, 6 of the clamp device 4 are in the required proper position relative to the position of the structure to be welded 1. Typically, the structure 1 is brought to a welding station and located in position therein by means independent from the clamp device 4. Therefore, the position of the structure 1 to be welded is to be considered as predetermined and is then necessary that elements 5, 6 are at a proper position relative thereto. When the structure 1 reaches the welding station, it is arranged on the supporting element 5, in the condition shown in FIG. 1, but, obviously, with the movable clamp element 6 in an upwardly rotated condition with respect to that shown in FIG. 1. Once the structure 1 has been positioned on the supporting element 5, the cylinder 16 may then be activated to drive a closing movement of the movable clamp element 6 over the two juxtaposed flanges 2a, 3a of the two components of sheet metal 2, 3, so precise location and clamping of these flanges between the two elements 5, 6.

As it is clearly apparent, in the known solution, if it is necessary to register the position of the supporting element 5, the plates 9, 10 must be replaced with plates having different thickness, so as to adjust the position of element 5 along the two orthogonal axes (vertically and horizontally) lying in the plane of FIG. 1. Similarly, a registration of element 6 along the horizontal and vertical direction implies replacement of plates 13, 14.

Therefore, the adjustment operations on clamp devices according to the prior art are troublesome and time consuming and imply a loss in the projectivity of the plant where these devices are used.

SUMMARY OF THE INVENTION

The object of the present invention is that of overcoming this drawback.

In view of achieving this object, the invention provides a clamp device of the type indicated at the beginning of the present description, characterized in that said body carrying the movable clamp element of the device is supported on its turn by said fixed supporting structure by means of said first supporting element, to which said body carrying the movable clamp element is directly connected.

Due to this feature, the time consuming and troublesome adjustment operations which are necessary in the known devices have been eliminated, since said first supporting element and said second clamp element are not carried by the fixed supporting structure independently from each other. On the contrary, the body carrying the movable clamp element is directly connected to the first supporting element, so that the position of the first supporting element relative to the second clamp element is univocally determined and defined once and for all. Therefore, no operation for registering this position is necessary. At most, only a registration of the whole unit formed by the first supporting element and the second movable clamp element relative to the fixed supporting structure may only be necessary, due to possible wear or deformations which originate with time.

According to a further feature of the invention, in order to simplify also this last remaining registering operation, the above mentioned first supporting element is connected to the fixed supporting structure by screws which are engaged within holes of enlarged diameter, so as to allow for a simultaneous registration of the position of the supporting element along two directions orthogonal to each other.

Moreover, the fixed supporting structure preferably comprises an angled supporting member which is in contact with two orthogonal surfaces of the first supporting element to provide a reference of the proper assembling position of the supporting element relative to the fixed supporting structure, when the supporting element has to be disassembled temporarily. Between the above mentioned angled supporting member and the two above mentioned orthogonal surfaces of the supporting element two plates are interposed by which the assembling position of the supporting element can be adjusted.

BRIEF DESCRIPTION OF THE DRAWINGS

The invention will be now described with reference to the annexed drawings, given purely by way of non limiting example, in which:

FIG. 4 shows the device of FIGS. 2, 3 in a side view similar to that of FIG. 3, but in the inoperative condition, and FIG. 5 shows a variant of FIG. 2.

DETAILED DESCRIPTION OF THE INVENTION

Figures 1, 3:
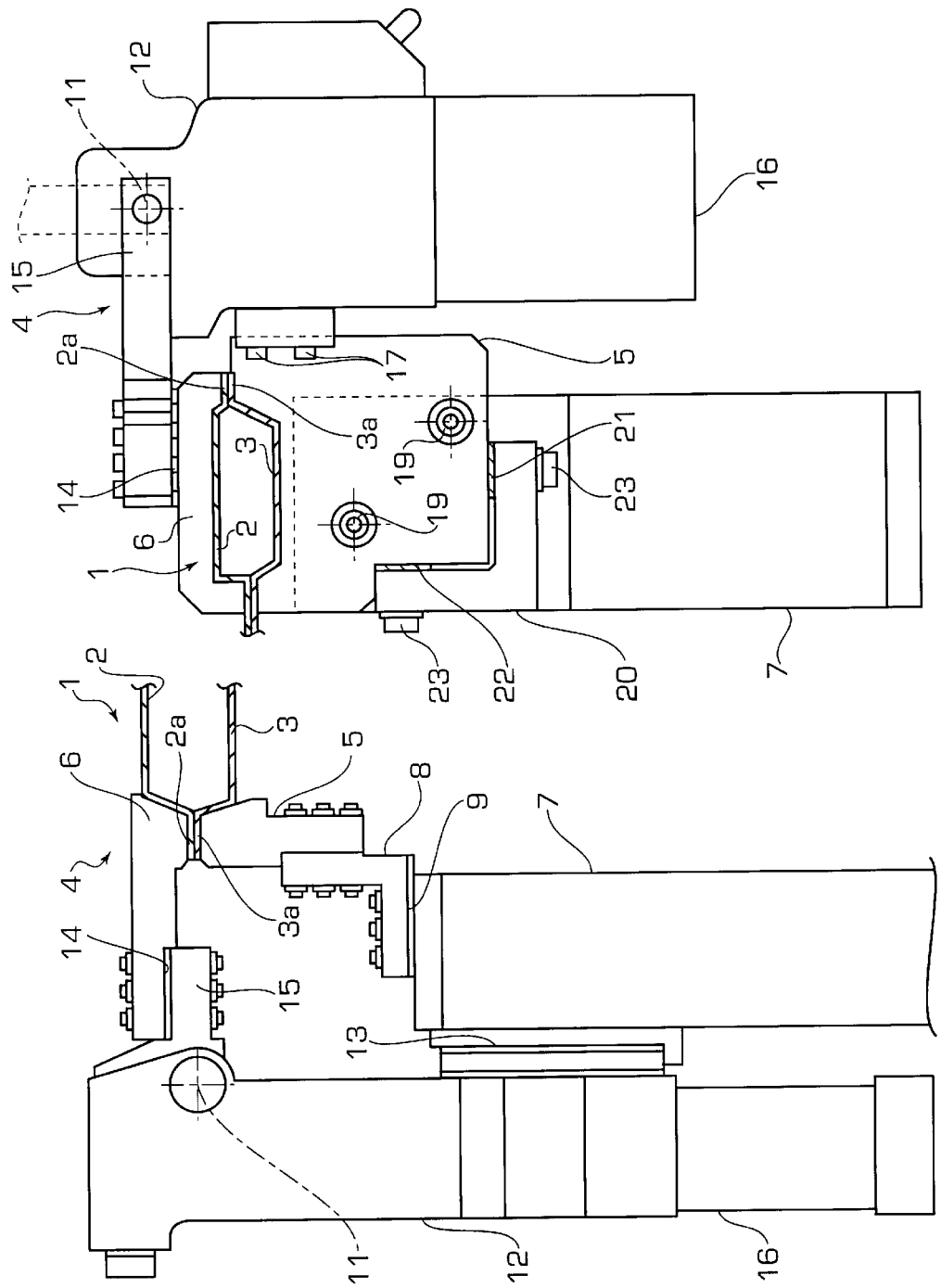
FIG. 1 is a diagrammatic side view of a device according to the prior art.
FIG. 3 is a side diagrammatic view of the device of FIG. 2, shown in the operative condition.
Figure 2:
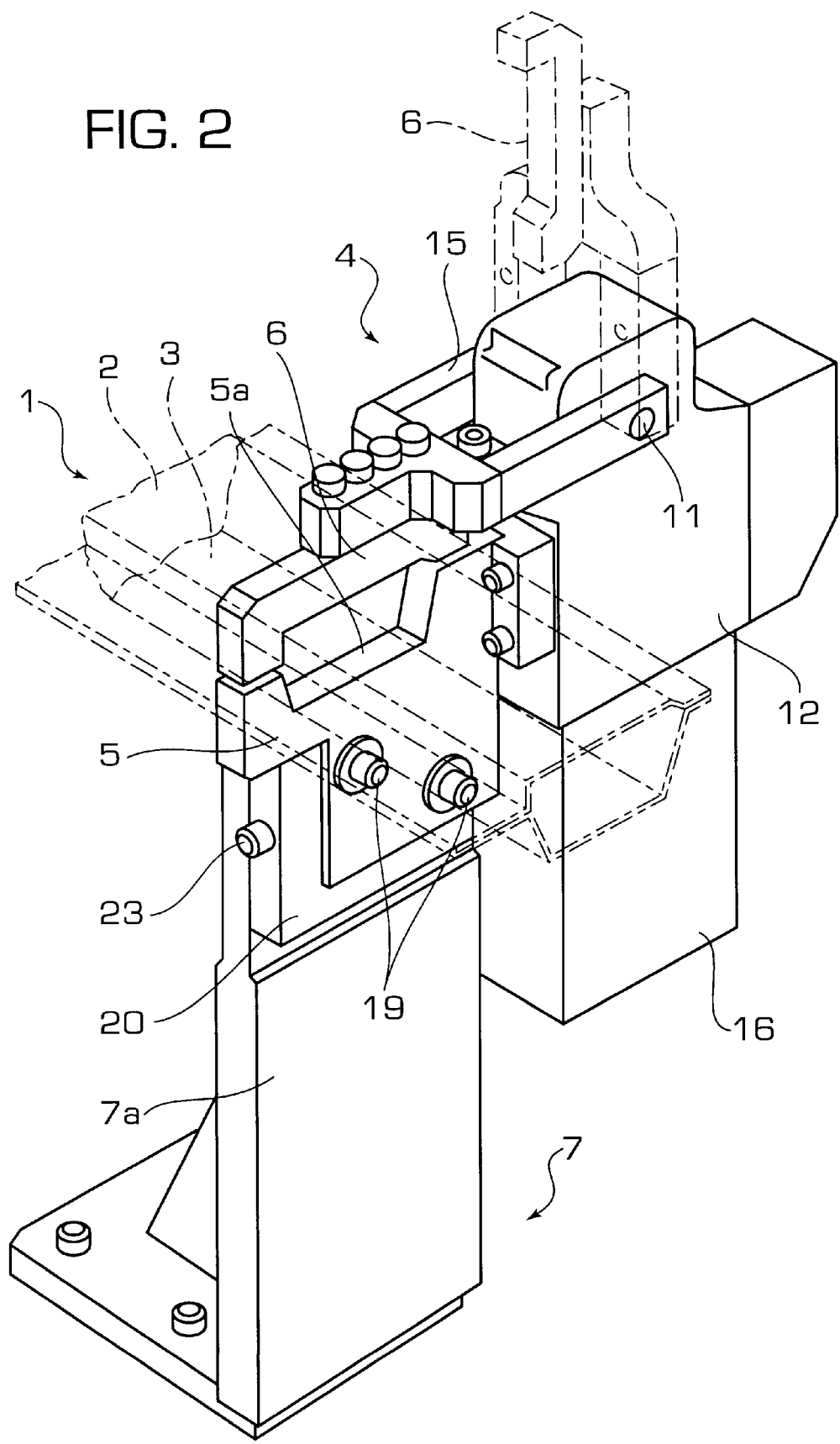
FIG. 2 is a perspective diagrammatic view of a first embodiment of the device according to the invention.

In FIGS. 2–5, parts which are in common to those shown in FIG. 1 are designated by the same reference numerals.

The main difference of the device according to the invention with respect to the known device shown in FIG. 1 lies in that in the case of the device according to the invention the body 12 carrying the movable clamp element 6 is not secured directly to the fixed supporting structure 7, but rather is carried by the latter by means of the first supporting element 5. As a matter of fact, the body 12 is secured by screws 17 to a bracket 18 which on its turn is directly secured to the supporting element 5. There is no other direct connection between body 12 and the fixed structure 7. Therefore, contrary to the known device, in which the elements 5, 6 are carried independently by the fixed structure 7, the relative position of these elements is univocally determined and defined once and for all and therefore does not need to be registered. At most, a registering operation of the whole unit formed by the two elements 5, 6 may still be necessary, due to wears or deformations which can be originated with the time. This operation can be made simply by adjusting the position of the supporting element 5 relative to the fixed structure 7. In order to simplify this last remaining registering operation, the fixed supporting element 5, having an upper edge 5*a* shaped to define a reference for the structure to be clamped, is constituted by a vertical plate secured to a vertical wall 7*a* of the fixed supporting structure 7 by means of a pair of screws 19 which engage holes of corresponding diameter formed in wall 7*a* and holes of enlarged diameter formed in plate 5. By loosening the screws 19, is therefore possible to register simultaneously the position of plate 5 relative to the structure 7 along two directions orthogonal to each other, i.e. along the horizontal direction and the vertical direction in the plane of FIGS. 3, 4.

As already indicated above, according to a further feature of the present invention, in order to provide an immediate reference of the proper position for the assembling of plate 5, on the fixed structure 7 there is mounted an angled supporting member 20 against which orthogonal edges 5*b*, 5*c* of plate 5 are supported, with the interposition of plates 21, 22. When first using the device, the angled member 20 is not yet mounted on the fixed structure 7. The plate 5 is adjusted in the proper position and than fixed by means of screws 19 to the structure 7. At this time, the angle member 20 is brought in contact with the two edges 5*b*, 5*c* of the plate 5, with the interposition of plates 21, 22. Screws 23 lock the angled member 20 on the plate 5 and hold the plates 21, 22. The seats of screws 23 on the angled member 20 are provided to allow an orthogonal movement of the plate in case of a variation of plates 21, 22. The angled member 20, once assembled on plate 5 with plates 21, 22 is welded or otherwise secured to structure 7. In this manner, if plate 5 has to be disassembled, it can be immediately mounted again and positioned in the proper position, due to the reference provided by the angled member 20.

In the use of the device, similarly to known devices, the structure to be welded is clamped between the fixed element 5 and the movable element 6, which is closed over the fixed element 5. The closed and opened positions of element 6 are shown respectively in FIGS. 3, 4 and also in FIG. 2 respectively with solid lines and dotted lines. As already indicated, the device according to the invention has the advantage that it never requires an operation for registering the relative position of the two elements 5, 6, since the body 12 carrying the element 6 is directly mounted on the element 5. At most an operation for registering the whole unit of the two elements 5, 6 may be necessary, which can be made by loosening screws 19, removing the plates 21, 22, and then tightening again the screws 19 so that the new required position of plate 5 has been reached and two new plates 21, 22 of suitable size have been inserted, so as to provide again an immediate reference for the proper assembly position of plate 5.

FIG. 5 shows a variant in which the angled member 20 has been replaced by two separate beams 20*a*, 20*b* welded to the structure 7, whereas the two orthogonal screws 23 have been replaced by a single screw 230 arranged at 45° at the corner between edges 5*b*, 5*c* of element 5.

As it is clearly apparent from the foregoing description, the device according to the invention avoids the time consuming and troublesome registering operations which are necessary with the known devices.

Naturally, while the principle of the invention remains the same, the details of construction and the embodiments may widely vary with respect to what has been described and illustrated purely by way of example, without departing from the scope of the present invention.

What is claimed is:

1. Device for locating and locking in position components of pressed sheet metal to be subjected to a welding operation, comprising:

a supporting element for supporting the sheet metal elements, rigidly connected to a fixed support structure, and a movable clamp element for clamping the sheet metal elements to be welded, said movable clamp element being rotatably mounted on a body carried by said supporting element for rotation between an inoperative position, spaced from the supporting element, and an operative position, in which it is adjacent to the supporting element and cooperates therewith to clamp said sheet metal components, a cylinder carried by said body and operatively connected to said movable clamp element for rotating said moveable clamp element, wherein said body carrying the movable clamp element is supported by said fixed support structure by means of said supporting element, to which said body carrying the movable clamp element is directly connected.

2. Clamp device according to claim 1, wherein said supporting element is connected to the fixed supporting structure by screws engaged within holes in said supporting element having enlarged diameters so as to allow for simultaneous registration of the position of the supporting element with respect to the fixed support structure along two mutually orthogonal directions.

3. Device for locating and locking in position components of pressed sheet metal to be subject to a welding operation, comprising:

a supporting element for supporting the sheet metal elements, rigidly connected to a fixed support structure, and a movable clamp element for clamping the sheet metal elements to be welded, said movable clamp element being supported by a body carried by said supporting element so as to be displaceable between an inoperative position, spaced from the supporting element, and an operative position, in which it is adjacent to the supporting element and cooperates therewith to clamp said sheet metal components, wherein said body carrying the movable clamp element is supported by said fixed support structure by means of said supporting element, to which said body carrying the movable clamp element is directed connected, wherein said supporting element is connected to the fixed supporting structure by screws engaged within holes in said supporting element having enlarged diameters so as to allow for simultaneous registration of the position of the supporting element with respect to the fixed support structure along two mutually orthogonal directions, wherein the fixed support structure is provided with an angled supporting member in contact with two orthogonal edges of the supporting element to provide a reference for the proper assembling position of the supporting element.

4. Clamp device according to claim 3, wherein registering plates are interposed between said angled member and said supporting element.

* * * * *